United States Patent [19]

Lee

[11] Patent Number: 5,569,400
[45] Date of Patent: Oct. 29, 1996

[54] SOLDERING GUN WITH U-SHAPED INSERTABLE TERMINAL STRUCTURE AND TIP HAVING DIFFERING IMPEDANCE LAYERS

[76] Inventor: In S. Lee, 20520 SW. Kirkwood St., Aloha, Oreg. 97006

[21] Appl. No.: 202,350

[22] Filed: Feb. 28, 1994

[51] Int. Cl.[6] .............................. B23K 3/02; H05B 1/02
[52] U.S. Cl. ....................... 219/233; 219/229; 219/230; 219/505; 228/54; 228/55
[58] Field of Search .................................... 219/229, 230, 219/233, 237, 238, 541, 505; 228/51, 55, 54

[56] References Cited

U.S. PATENT DOCUMENTS

| | | | |
|---|---|---|---|
| 1,515,261 | 11/1924 | Lightfoot | 219/541 |
| 2,074,629 | 3/1937 | Ungar | 219/237 |
| 2,679,223 | 5/1954 | Franklin . | |
| 2,692,935 | 10/1954 | Pearce et al. | 219/230 |
| 3,245,599 | 4/1966 | Johnson | 219/229 |
| 3,316,385 | 4/1967 | Anton | 219/229 |
| 3,580,462 | 5/1971 | Vanyi . | |
| 3,651,306 | 3/1972 | Glyptis . | |
| 3,786,229 | 1/1974 | Hombrecher . | |
| 3,851,145 | 11/1974 | Fukanaga . | |
| 3,881,087 | 4/1975 | Nicosia | 219/233 |
| 3,883,716 | 5/1975 | Fortune . | |
| 3,899,114 | 8/1975 | Kleeberg | 228/55 |
| 3,945,553 | 3/1976 | Nicosia . | |
| 3,955,064 | 5/1976 | Demetrio et al. | 219/225 |
| 3,982,099 | 9/1976 | Churchill | 219/544 |
| 3,984,655 | 10/1976 | Wahl | 219/233 |
| 4,023,724 | 5/1977 | Wakita et al. . | |
| 4,560,101 | 12/1985 | Wilhelmson et al. . | |
| 4,686,737 | 8/1987 | Fortune . | |
| 4,699,123 | 10/1987 | Zaborowski . | |
| 4,733,651 | 3/1988 | Schawbel et al. . | |
| 4,916,289 | 4/1990 | Suhanek | 219/230 |
| 5,094,384 | 3/1992 | Urban | 228/165 |
| 5,248,076 | 9/1993 | Eisele et al. . | |

FOREIGN PATENT DOCUMENTS

564175  12/1923  France ................................. 219/233

*Primary Examiner*—John A. Jeffery
*Attorney, Agent, or Firm*—Marger, Johnson, McCollum & Stolowitz PC

[57] ABSTRACT

A solder gun or soldering iron contains a pair of electrical terminals that hold a solder tip containing a pair of straight parallel leads. Each lead has a substantially U-shaped cross-section that creates a circular cavity filled which is filled with an insulative material. The soldering tip is made from either a low impedance material such as copper or high impedance material such as a multi-layer material of steel, copper and nickel that automatically maintains the soldering tip at a constant temperature. The soldering device also comprises a universal connector that receives both a solid solder tip and a hollow soldering tip. A rack extending around the soldering device allows quick and easy exchange of various solder tips into the universal connector. In another embodiment of the invention, the soldering device includes a multiple position trigger that both initiates heating of a solder tip and activates a suction mechanism.

16 Claims, 10 Drawing Sheets

SOLDERING GUN WITH U-SHAPED INSERTABLE TERMINAL STRUCTURE AND TIP HAVING DIFFERING IMPEDANCE LAYERS

BACKGROUND OF THE INVENTION

This invention relates generally to soldering devices and more particularly to solder tips and a dual purpose device for both applying and removing solder.

Figure 1:
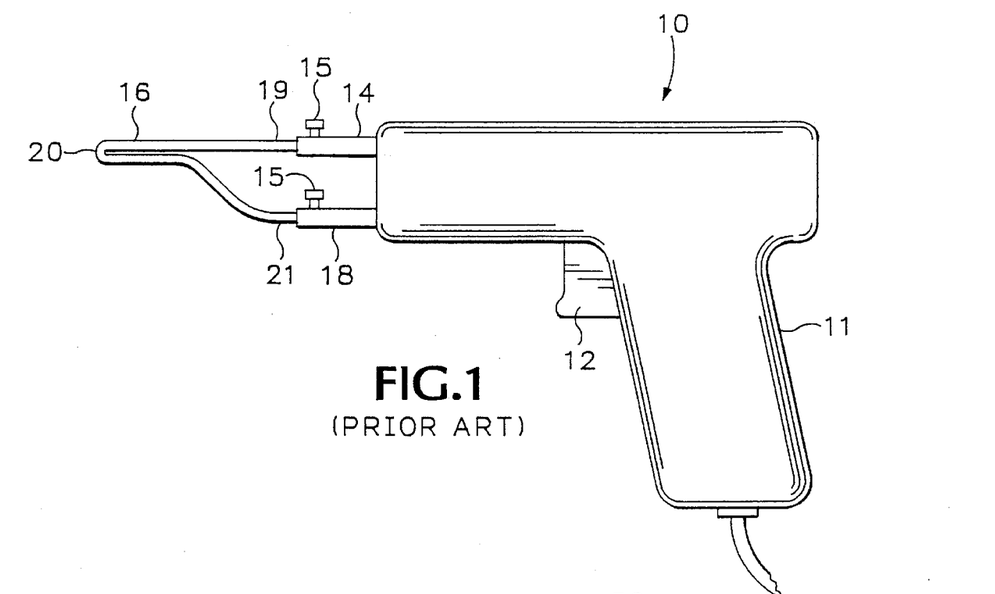
FIG. 1 is a side view of a prior art solder gun.

FIG. 1 shows a prior art "trigger activated" solder gun 10 having a main housing 11. By pressing a trigger 12, electrical power from a coil inside solder gun 10 (not shown) passes from terminal 14 through a solder tip 16 and then back through terminal 18. The resistance of solder tip 16 creates heat that is used to melt solder onto various articles.

For example, solder is used to electrically couple a lead on an integrated circuit (IC) to an electrical connection on a printed circuit board. Electric solder guns and their operation are well known to those skilled in the art and are, therefore, not described in detail.

Solder tip 16, however, is too wide to be easily placed in constricted locations and to apply solder with high precision. Solder tip 16 is so wide that front end 20 can easily touch two adjacent leads of an IC at the same time inadvertently soldering the leads together. In addition, opposite ends 19 and 21 of solder tip 16 are spaced relatively far apart when inserted into terminals 14 and 18, respectively. Because the ends 19 and 21 are spread apart, the overall structure of solder tip 16 is not very strong. Thus, a strong force exerted on solder tip 16 will cause the tip to bend or possibly break.

Solder tip 16 is also difficult to replace. For example, to attach solder tip 16 in solder gun 10, the ends 19 and 21 of solder tip 16 are inserted in terminals 14 and 18. Two screws 15 are then screwed into terminals 14 and 18 clamping onto the solder tip ends 19 and 21. To replace solder tip 16, screws 15 are unscrewed from terminals 14 and 18, solder tip 16 removed, and a second solder tip inserted. Screws 15 are then retightened into terminals 14 and 18. Thus, the present method for replacing solder tips is both difficult and time consuming.

The temperature of solder tips varies according to the amount of drive current passing through the solder tip and according to the type of materials that come into contact with the solder tip. For example, a material coming into contact with solder tip 16 can act as a heat sink, directing heat away from the solder tip. Continuous changes in solder tip temperature shorten solder tip operating life and make it difficult to maintain a consistent temperature sufficient to melt solder.

U.S. Pat. No. 3,883,716 to Fortune describes an electronic circuit for maintaining a constant temperature at the tip of a soldering device. However, solder tip temperature is controlled by using complex electronic circuitry. The circuitry increases manufacturing costs and is susceptible to electrical malfunctions.

Figure 8:
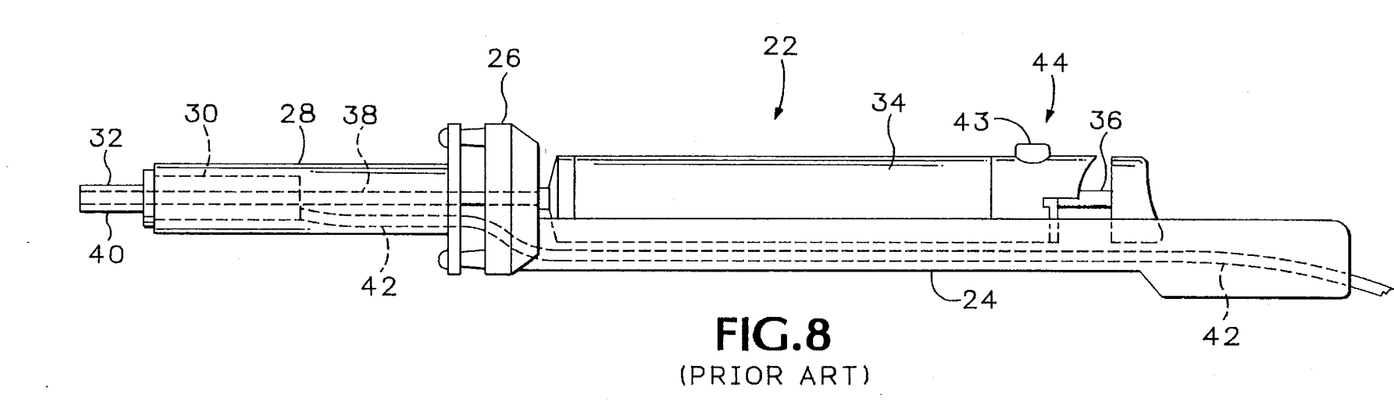
FIG. 8 is a side view of a prior art solder sucker.

To remove existing solder joints, a special device known as a solder sucker is used to first melt and then ingest the molten solder. FIG. 8 shows a prior art solder sucker 22. The solder sucker 22 includes a handle 24 coupled by a mounting base 26 to a heating section 28. A heating element 30 is located in heating section 28 and is joined at a front end to a hollow solder tip 32.

A plunger 34 is detachably mounted to the top of handle 24. The plunger 74 includes a plunger rod 36 that extends a spring (not shown) inside the plunger 34 lockable into a "cocked" position as shown in FIG. 8. A locking mechanism 44 at a back end of plunger 34 latches to the plunger rod 36 holding the plunger rod 36 in the "cocked" position. A hollow pipe 38 extends from a vacuum hole (not shown) at the front end of plunger 34, through heating section 28 and to a cavity 40 in the hollow solder tip 32. Solder tip 32 becomes hot when heating element 30 is energized via an external power supply (not shown). The power supply is connected to heating element 30 by an electrical cord 42 as shown in phantom inside the handle 24.

To remove existing solder joints between two devices, plunger 34 is first locked into the "cocked" position as shown in FIG. 8. After solder tip 32 reaches a sufficient temperature, it is pressed against a solder joint melting the solder joint. A button 43 in locking mechanism 44 is then depressed releasing the plunger rod 36 from the cocked position. Plunger rod 36 is pulled in a backward direction by a spring (not shown) creating a vacuum inside pipe 38. The vacuum pulls molten solder through solder tip 32 and pipe 38 into a cavity inside plunger 34.

The solder sucker 22 is used in coordination with a solder gun. For example, a solder gun is used to apply solder to an electrical terminal. When solder is deposited in the wrong location, a soldering iron (see FIG. 1) must be carefully set down to prevent accidental melting or burning. The solder sucker 22 is then picked up and the hollow solder tip 32 pressed against the unwanted solder joint. The solder joint is then remelted and the solder sucker activated to remove the molten solder. The solder sucker is then placed back into its previous location and the solder iron again picked up to continue the soldering process.

Using both a solder iron and a solder sucker is expensive and wastes energy since two separate devices have to be continuously heated at the same time. Using two soldering devices is also time consuming and awkward since both devices are continuously picked up and laid down. Because it takes a substantial amount of time to switch between the solder iron and the solder sucker, when solder is mislaid, the solder has more time to cool and harden. Thus, more time is required to remelt and remove the mislaid solder.

It is also awkward to both hold the solder sucker and activate the suction mechanism at the same time. For example, after a solder joint has been deposited in the wrong location, hollow solder tip 32 must be carefully replaced at the exact location of the solder joint. The trigger mechanism is then activated by pressing the button 43.

U.S. Pat. No. 4,023,724 to Wakita et al shows a solder gun with a trigger activated suction pump that creates a vacuum in a solder removing bit. Molten solder is removed by pulling solder through the solder bit. Because the solder bit remains heated, energy is also wasted when the solder bit is not actually melting solder. It is also more likely that someone or something will get burned since the solder bit remains heated when not in use.

Accordingly, a need remains for a low cost device for quickly and accurately applying and removing solder with an easy to attach solder tip that is resistent to bending while at the same time maintaining a constant temperature over a wide range of operating conditions.

SUMMARY OF THE INVENTION

It is, therefore, an object of the invention to increase the number of soldering functions performed by a single soldering device.

Another object of the invention is to reduce the difficulty and time required to remove solder joints.

Another object of the invention is to increase energy efficiency and safety when soldering and desoldering.

Another object of the invention is to increase the strength of solder tips.

Still another object of the invention is to increase controllability of solder tip temperature.

A further object of the invention is to simplify the attachment and detachment of solder tips onto soldering devices.

A solder gun or soldering iron, herein referred to as a solder device contains a set of terminals that clamp around a novel solder tip. The terminals are arranged so that the solder tip can be easily inserted and secured with a single screw.

The solder tip comprises a pair of elongate leads that insert between the terminals. The two leads are parallel and extend horizontally about a common axis maintaining a narrow separation distance. In one embodiment, each lead has a substantially U-shaped cross-section that is arranged to create a substantially circular internal cavity and a substantially circular outside solder tip surface. The internal cavity of the solder tip is filled with an insulative material that keeps each solder tip lead electrically isolated when the two leads are clamped between the terminals of the soldering device.

The close spacing of the two leads of the solder tip in coordination with their opposed U-shaped cross-sectional shapes provide a stronger structure than present solder tips. In addition, the small cross-sectional diameter of the solder tip allows access into highly constricted locations. The solder tip in one embodiment is tooled to a relatively sharp point at a front end while still maintaining a strong overall tip structure. Another embodiment of the solder tip comprises a claw configuration for easier access to locations difficult to access with straight solder tips.

In another embodiment of the invention, a soldering device operates as both as a solder iron for applying solder and a solder sucker for removing solder. The soldering device includes a universal connector that is capable of receiving either a solid solder tip used for applying solder or a hollow solder tip used as a conduit for ingesting solder into a plunger attached to the soldering device.

Because the universal connector accepts both solid and hollow solder tips, a single soldering device can both apply and remove solder. A rack extends around the soldering device and has multiple holes that allow quick and easy exchange of solder tips into the universal connector.

In another embodiment of the invention, the soldering device includes a multi-position trigger. In a first position, the trigger activates a heat source that heats the inserted solder tip. In a second position, the trigger activates the plunger pulling molten solder through the hollow solder tip into a chamber inside the soldering device. The dual position trigger provides the advantages of a solder gun (e.g., finger tip heating control) while at the same time ensuring accurate soldering and desoldering.

The universal connector can also be operated with alternative heat sources such as butane. The butane is ignited creating a flame that heats the universal connector. Thus, the butane soldering/desoldering device is also portable and is operated without having to be near an electrical outlet.

The soldering device generates suction by various methods. For example, in one embodiment a simple spring triggered plunger generates suction when a button is depressed. The spring pulls a "cocked" plunger rod backwards inside a chamber within the soldering device. As the plunger rod moves backward, a vacuum is created at a front end of the solder tip. Alternatively, the soldering device uses an electrically operated vacuum pump.

Thus, the soldering device both applies and removes solder by means of a universal connector that holds both solid and hollow solder tips. Inside walls on the front end of the universal connector are angled sufficiently to hold the solder tips firmly when initially cold. However, the inside walls are also angled to allow the solder tips to be easily removed when heated after some expansion has taken place.

Since the solder tips are easily moved from the universal connector to a rack on the solder device, solder can be quickly and easily applied and removed with a single soldering device. In addition, the novel triggering configuration also allows more efficient and accurate solder removal.

The foregoing and other objects, features and advantages of the invention will become more readily apparent from the following detailed description of a preferred embodiment of the invention which proceeds with reference to the accompanying drawings.

DETAILED DESCRIPTION

Figure 2:
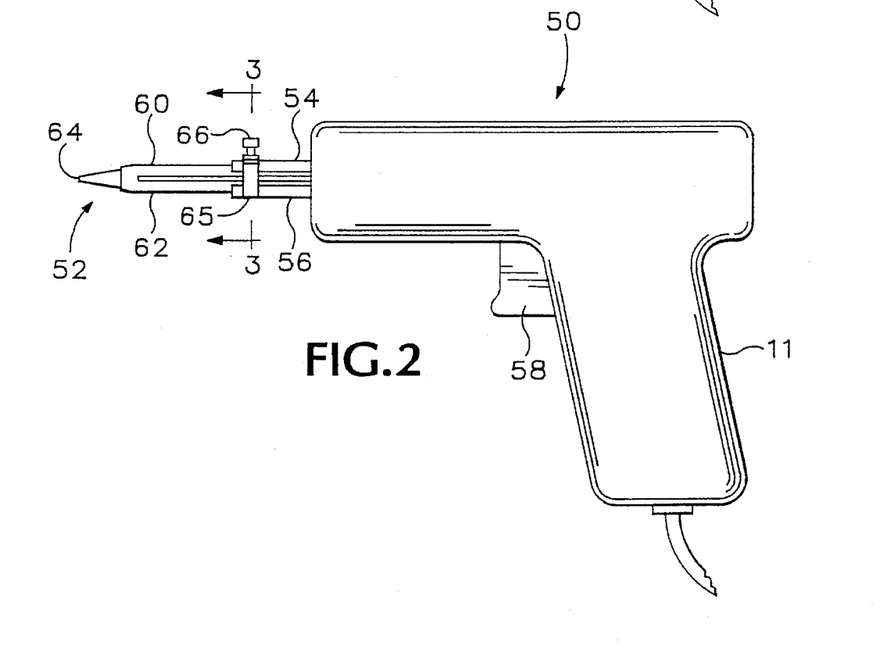
FIG. 2 is a side view of a solder gun with novel terminals and solder tip according to a first embodiment of the invention.

FIG. 2 is a side view of a solder gun 50 with a solder tip 52 according to a first embodiment of the invention. The internal components and circuitry of the solder gun 50 are well known to those skilled in the art and, therefore, are not described in detail.

Solder gun 50 comprises an upper terminal 54 and a lower terminal 56 that are coupled to a front end. Both terminals 54 and 56 are electrically conductive and are coupled to opposite polarities of an electrical transformer (not shown) located inside solder gun 50. A trigger 58 is depressed to initiate current flow from the transformer through solder tip 52 and discontinues current flow when released.

The solder tip 52 includes an upper lead 60 and a lower lead 62 that extend horizontally out from between terminals 54 and 56. The upper and lower leads are coupled together at their front ends forming a pointed front end 64. The rear ends of leads 60 and 62 are clamped between the upper and lower terminals 54 and 56, respectively, by a band 65 that is held together by a screw 66.

Figure 3:
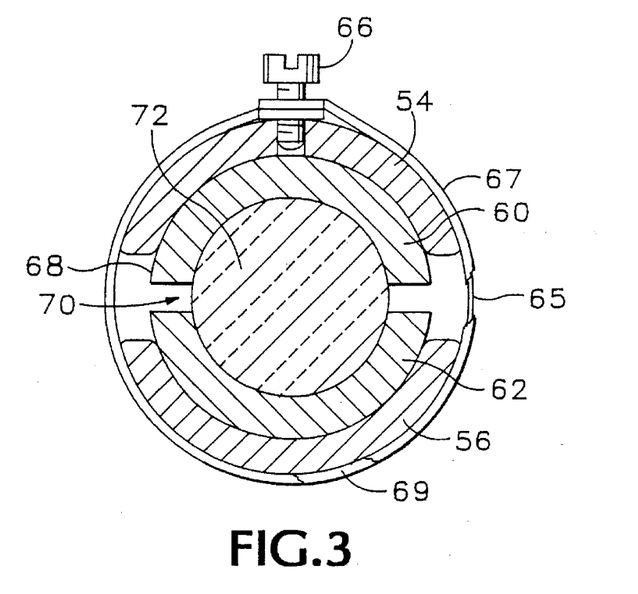
FIG. 3 is a front-section of the solder tip shown in FIG. 2 taken along line 3—3.

FIG. 3 is a front-section view of the solder tip 52 taken along line 3—3 in FIG.2. The upper lead 60 and the lower lead 62 each have U-shaped cross-sections aligned in opposite directions creating a substantially round outer surface 68 and round internal cavity 70. Upper terminal 54 and lower terminal 56 each have a slightly rounded U-shaped cross-sectional shape. The terminals are aligned in opposite directions to form a substantial circular cavity sized for receiving the back ends of leads 60 and 62.

An insulative material 72, such as a heat resistant cloth, is inserted in cavity 70 between the upper and lower leads 60 and 62, respectively. The insulative material 72 extends substantially the entire length of solder tip 52. Band 65 is typically made out of a metal material such as steel and is covered with a insulative heat resistant material 67, such as a heat resistant heat shrink plastic. Band 65 is retained inside a channel 69 routed on the outside surface of both the upper and lower terminals 54 and 56. Screw 66 extends through opposite ends of band 65 and vertically through upper terminal 54 clamping onto upper lead 60.

In one embodiment, solder tip 52 is approximately five centimeters long. The upper and lower leads 60 and 62 are separated at the lateral sides by approximately one millimeter and form an internal cavity 70 with a diameter of approximately three millimeters. Each lead of solder tip 52 is approximately 0.5 millimeters thick. Correspondingly, the upper and lower terminals form an interior cavity having a diameter of approximately four millimeters.

Referring to both FIGS. 2 and 3, the method for inserting and attaching solder tip 52 to solder gun 50 is as follows. The rear end of leads 60 and 62 are pressed slightly together compressing insulative material reducing the outside diameter of the solder tip. The solder tip 52 is then inserted between the upper and lower terminals 54 and 56, respectively. The insulative material 72 prevents leads 60 and 62 from making contact and also serve to hold each lead firmly against the inside surface of terminals 54 and 56.

It is possible to simply press fit the solder tip 52 between the terminals 54 and 56. However, to further secure the solder tip 52 between terminals 54 and 56, band 65 holds the terminals tightly together. Screw 66 is moved downward clamping against upper lead 60.

Because the upper and lower leads 60 and 62 combine to form a relatively small diameter, solder tip 52 can reach locations not readily accessible by standard solder tips such as solder tip 16 shown in FIG. 1. For example, solder tip 16 shown in FIG. 1 cannot be inserted between two objects that are positioned relatively close together. However, the close spacing between leads 60 and 62 allow solder tip 52 to be placed into very confined spaces.

Because the upper and lower leads 60 and 62 are closely spaced together, the rigidity of solder tip 52 is greater than solder tip 16. For example, both leads 60 and 62 co-act to resist bending when the solder tip 52 is pressed against an object. The opposed "U-shaped" cross-sections of each lead resist bending from forces applied at any angle.

The front end 64 is shown tapered to a relatively sharp point allowing high precision spot soldering. However, front end 64 can be configured with a wide variety of different shapes for different types of solder applications. For example, a blunt front is used for applying wider solder joints. Alternative solder tips are shown below in FIGS. 4 and 5.

Because upper lead 60 and lower lead 62 are inserted between the same two terminals, solder tip 52 is attached and detached more quickly and easily than solder tip 16 shown in FIG. 1. For example, only a single clamp mechanism (i.e., screw 66) is needed to lock the solder tip 52 in terminals 54 and 56. The solder tip 16 in FIG. 1, however, requires one screw for each lead.

Figure 4:
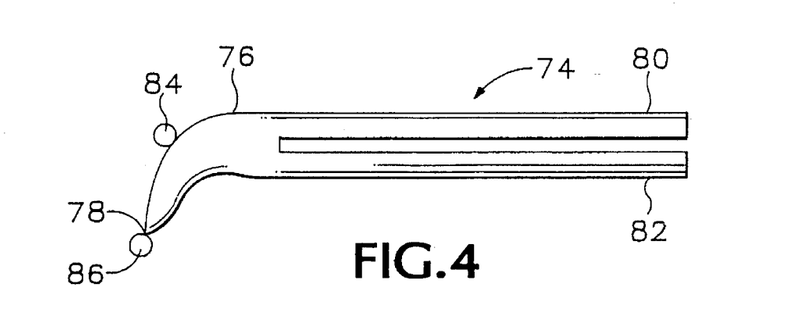
FIG. 4 is a side view of a claw shaped solder tip according to another embodiment of the invention.

Referring to FIG. 4, a solder tip 74 comprises a claw shaped front end 76 having a downwardly sloping point 78. The claw shaped front end 76 joins a front end of an upper lead 80 to a front end of a lower lead 82. The cross-sectional shape of leads 80 and 82 are substantially the same as the cross-sectional shape of leads 60 and 62 shown in FIG. 3. The claw shaped front end 76 enables soldering in locations that typically are not accessible with straight solder tips. For example, the point 78 of solder tip 74 can be placed underneath or around an object such as a wire 84 to gain access to another wire 86.

Solder tip 74 also has the advantage of varying the amount of solder tip surface area that is contacted with a solder surface. For example, only a small surface area on wire is heated when point 78 is used as the heating contact point. However, when the entire surface of a wire needs to be heated quickly, the entire inside surface of claw shaped front end 76 is pressed against wire 84 as shown in FIG. 4.

Figure 5:
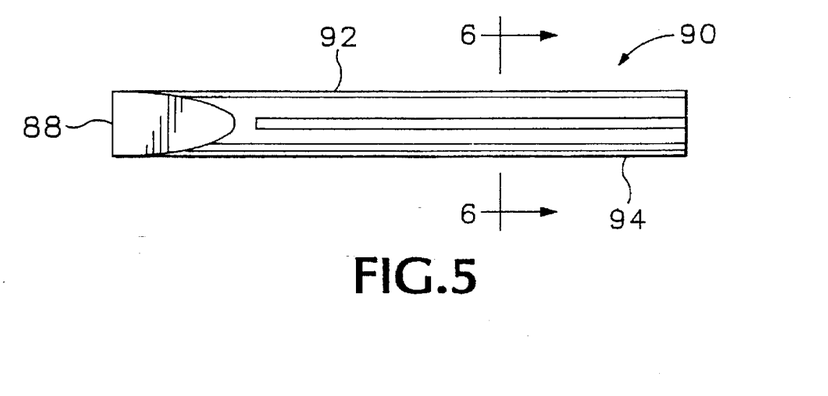
FIG. 5 is a side view of a flat ended solder tip according to another embodiment of the invention.
Figure 6:
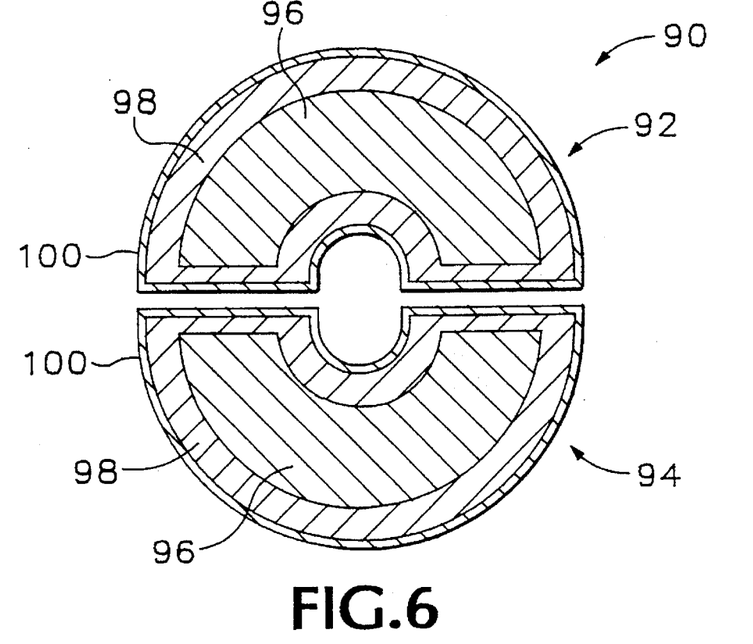
FIG. 6 is a front-section of a multi-layer solder tip according to another embodiment of the invention taken along line 6—6 in FIG. 5.

FIG. 5 is a side view of a solder tip 90 having a flat front end 88 and FIG. 6 is a detailed front-section of the solder tip 90 shown in FIG. 5 taken along line 6—6. Solder tip 90 comprises an upper lead 92 and a lower lead 94 similar in shape to the leads shown in FIG. 2. However, the internal composition of the solder tip 90 comprises multiple layers of metal that combine to provide automatic temperature control.

Each lead of solder tip 90 includes a steel core 96 covered by a first copper layer 98, and a second nickel exterior layer 100. The steel core 96 provides a strong rigid structure that prevents the solder tip 90 from bending. The impedance of steel core 96 also varies according to temperature. Copper layer 98 provides current path that allows quick heating of the solder tip 90. The hard nickel exterior layer 100 provides a hard anti-corrosive solder tip surface that extends operating life of the solder tip 90.

The steel core 96 and the copper layer 98 also have the added advantage of co-acting to provide a high impedance solder tip that automatically controls solder tip temperature. For example, the impedance of steel core 96 varies according to temperature maintaining a low impedance at low temperatures and a high impedance at high temperatures. The variable resistance of steel core 96 works in combination with copper layer 98 so that solder tip 90 can quickly heat while still maintaining temperature controllability.

Initially, solder tip 90 is cold, therefore, steel core 96 exhibits a low resistance. The low resistance of the steel core 96 and the high conductor-heat 98 allow the solder tip to heat quicker than a solid steel solder tip. As current is passed through solder tip 90, the temperature of solder tip 90 increases resistance of steel core 96 and reducing the amount of current passing through the solder tip 90.

The solder tip 90 stabilizes to a predetermined temperature until heat is drawn from the solder tip.

Figure 7:
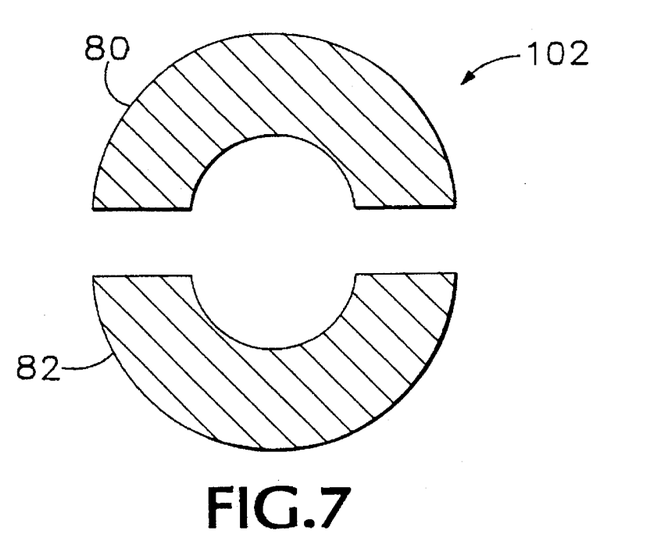
FIG. 7 is a cross-section of a solid solder tip comprised of a single metal.

Tests have shown that a solder tip constructed of a combination of steel and copper provides the best balance of temperature control and rapid heating. Optimal temperature control and heating speed are achieved with a solder tip constructed of 15%–30% copper and 70%–85% steel. If the solder tip were made of more than 50% copper, a majority of the current from the solder gun transformer would pass through layer 98. Therefore, the current of the solder tip would not change over temperature and the solder tip temperature would be more controlled. Experiments have also verified that the steel/copper alloy shown in FIG. 6 maintains a constant temperature for 0%–40% variations in the solder gun drive current. FIG. 7 shows a cross-section of a solid impedance solder tip 102 comprising a single metal such as copper or steel.

It is important to note that size and shape of any of the solder tips described can be varied according to the input impedance characteristics of the solder gun. The transformer inside each solder gun generates an output current level according to the turns ratio between the primary and secondary coils of the transformer (see FIG. 15). For example, a solder gun transformer with a single turn on the secondary would have a lower input impedance than a transformer with six turns on the secondary.

The size, shape and composition of the solder tip is varied according to the input impedance of the solder gun transformer. For maximum energy transfer, it is desirable to size the solder tip to equal the input impedance of the transformer. Therefore, a solder gun transformer with a low input impedance may use a shorter and wider solder tip that would have less impedance than a long thin solder tip. In addition, a less resistive metal may be used in the solder tip to further reduce impedance. The size, shape and composition of the solder tip also controls the amount of energy transferred from the solder gun transformer. If the solder gun transformer outputs a high output current level, the size and material of the solder tip are selected accordingly to prevent excessively high currents from passing through the solder tip.

Figure 9:
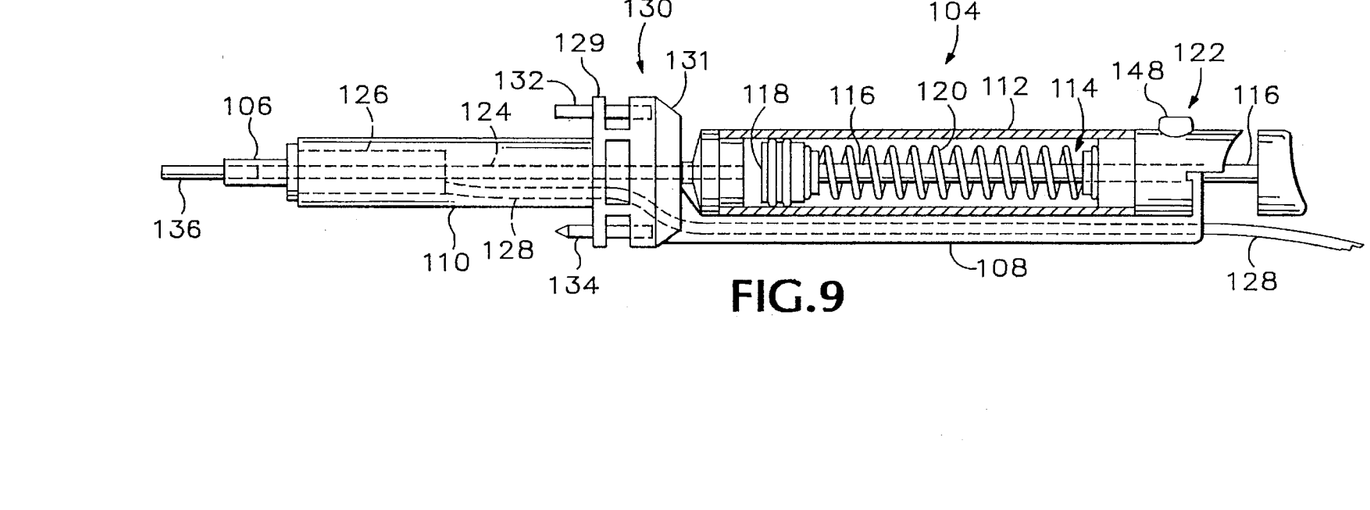
FIG. 9 is a partially broken away side view of a soldering device according to another embodiment of the invention.

FIG. 9 is a partially broken away side view of a soldering device 104 having a universal connector 106 according to another embodiment of the invention. The soldering device 104 includes a handle 108 joined by section 110 to the universal connector 106. The handle 108 holds a detachable plunger 112 having a plunger rod 116 joined at a front end to a puck 118 located inside a chamber 114. A spring 120 is joined between the puck 118 and the back end of chamber 114.

Figure 14:
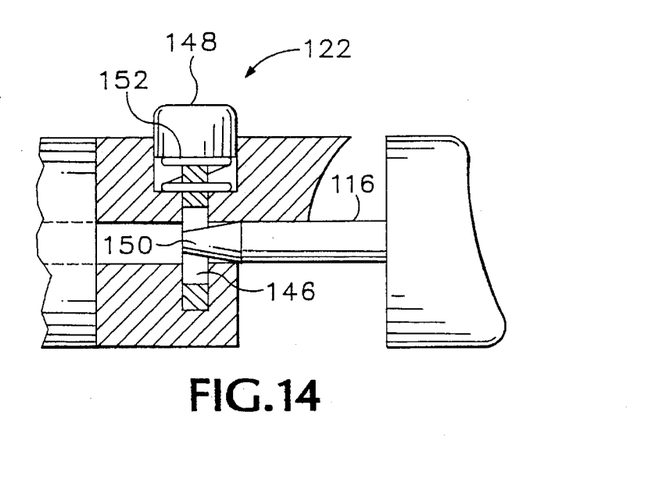
FIG. 14 is a detailed side-section of a locking device for the soldering device shown in FIG. 9

The plunger rod 116 is latched into the trigger position shown in FIG. 9 by a locking assembly 122 shown in detail in FIG. 14. Plunger rod 116 is moved forward into chamber 114 extending spring 120 until locked by locking assembly 122 in the "cocked" position. Locking assembly 122 is shown in detail in FIG. 14 and includes a button 148 attached to a lever 146. The button 148 is pushed into a raised position by a spring 152.

A pipe 124 is shown in phantom and extends through section 110 from universal connector 106 to a front end of plunger 112. A heating element 126 is attached to the universal connector 106 and is energized via power from an electrical outlet (not shown) over an electrical cord 128. A rack 130 includes a front face plate 129 and a base plate 131 that each extend around the soldering device 104. The rack 130 includes multiple holes that hold a variety of solder tips such as a hollow solder tip 132 and a solid solder tip 134. Rack 130 allows solder tips to be quickly exchanged in universal connector 106.

Figure 10:
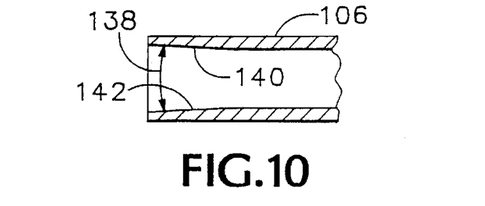
FIG. 10 is a detailed side-section of a universal connector previously shown in FIG. 9.
Figure 11:
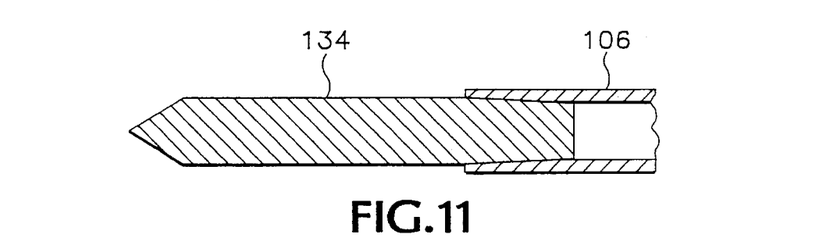
FIG. 11 is the side-section of the universal connector shown in FIG. 10 holding a solid solder tip.

FIGS. 10, 11, 12A, and 12B are detailed side-sections of the universal connector 106 shown in FIG. 9. Referring to FIG. 10–12, an inside wall of universal connector 106 has oppositely inclining sides 140 and 142 that provide a given angle 138. The angle 138 is sized to receive a variety of solder tips that are used for both applying and removing solder. The angle 138 is also sized so that each solder tip can be securely force fit by hand to universal connector 106.

The distance between sides 140 and 142 in combination with angle 138 also allows heated solder tips to be easily removed from universal connector 106. For example, solder tips expand slightly when heated. Therefore, if the solder tip is initially held too tight inside universal connector 106, the solder tip cannot be easily removed when in a expanded condition after being heated. Thus, the universal connector is sized for securely holding cold solder tips while allowing easy removal of heated solder tips.

A hollow solder tip 136 (also see FIG. 9) is shown in FIG. 11 inserted into universal connector 106 and is used when the soldering device 104 (FIG. 9) is used as a solder sucker. However, when the soldering device 104 is used for applying solder, hollow solder tip 136 is replaced with a solid solder tip such as solder tip 134 shown in FIG. 12A.

Figure 12A:
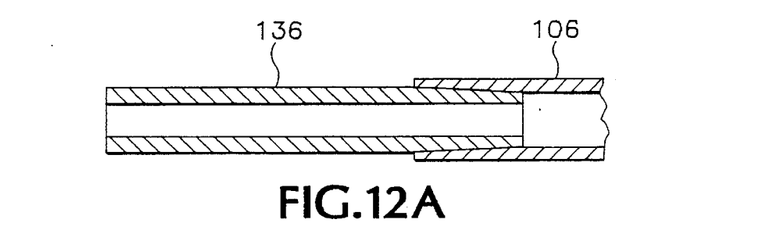
FIG. 12A is the side-section of the universal tip connector shown in FIG. 10 holding a hollow solder tip.
Figure 12B:
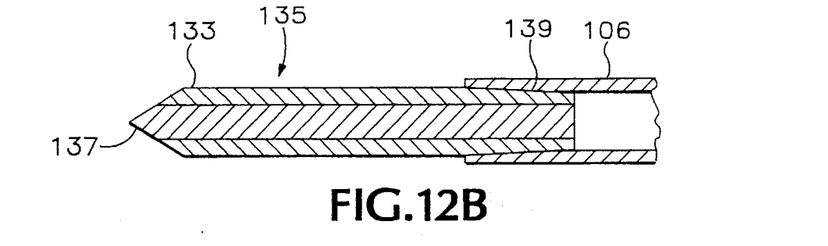
FIG. 12B is the side-section of the universal tip connector shown in FIG. 10 holding a solid solder tip comprised of two different materials.

FIG. 12B is a side section view of a solid composite solder tip 135 according to another embodiment of the invention. Solder tip 135 includes a center core of a hard metal material such as steel, iron or nickel. The outer layer 133 is made from a high conductive heating material such as copper. The hard metal core 137 also increases the strength of the solder tip 135 over a soft metal such as copper. For best adhesion, the core 137 is made from nickel and the outer surface is made from copper. Because the front end of solder tip 135 is mainly comprised of the hard core 137, solder tip 135 remains sharp longer. Also, by making core 137 from a material more adhesive to solder, solder melted by solder tip 135 will grab onto the solder easier than a material less adhesive to solder. A nickel alloy is placed over the outside of solder tip 135 to protect the outside surface on the solder tip 135 from corrosion.

Solder tips shown in FIGS. 11, 12A, and 12B are all tapered at the back end 139 at approximately the same angle as the front inside walls 140 and 142 of universal connector 106. Thus, the solder tips are securely held inside the universal connector and are prevented falling loose.

Figure 13:
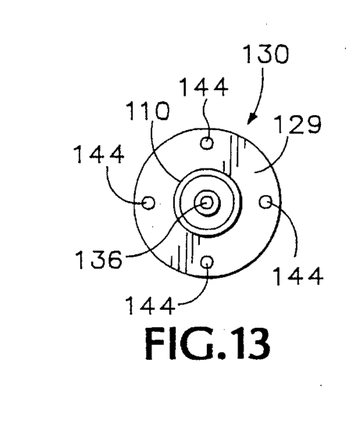
FIG. 13 is a front view of the soldering device in FIG. 9.

FIG. 13 is a front view of the solder device 104 in FIG. 9. The rack 130 contains various holes 144 that hold different solder tips (e.g., solder tips 134 and 136) when not inserted into universal connector 106. Referring to both FIGS. 9 and 13, a solder tip is inserted through a hole 144 in face plate 129 and into a second receiving hole in base plate 131. Thus, the solder tips are held snugly at two different locations by rack 130.

Referring to FIGS. 9–14, soldering device 104 operates in the following manner. When operating as a solder sucker, a hollow solder tip such as solder tip 136 is inserted into universal connector 106. Universal connector 106, and in turn, hollow tip 136 are heated via the heating unit 126. After becoming hot, hollow solder tip 136 is pressed against an existing solder joint.

After the hollow solder tip 136 melts the solder joint, button 148 is depressed releasing plunger rod 116 from the "cocked" position shown in FIG. 9. Upon pressing button 148, latch 146 moves out from a notch 150 in plunger rod 116. Spring 120 is then allowed to pull puck 118 toward the back end of chamber 114.

Puck 118 upon moving backwards, creates a vacuum in chamber 114 pulling air through pipe 124 and creating a suction at the front end of hollow solder tip 136. The suction in hollow solder tip 136 pulls molten solder through pipe 124 into chamber 114. The plunger rod 116 is then moved back into the cocked position shown in FIG. 9 ready to remove another solder joint. It should be noted that solder suckers are known to those skilled in the art and, therefore, the specific details on heating the universal connector 106 and the solder tips are not described in detail.

To operate as a device for applying solder, hollow solder tip 136 is removed from the universal connector 106, for example, with pliers, and inserted into one of the holes 144 in rack 130 (see FIG. 13). Solid solder tip 134 is then removed from rack 130 and press fit into universal connector 106. Heat from heating unit 126 is then conveyed to solder tip 134 via universal connector 106 generating sufficient heat in the solder tip 134 for melting solder. Solder tip 134 is tapered to a point at a front end allowing high precision soldering. Thus, the soldering device in FIG. 9 operates as both a soldering iron and a solder sucker.

Figures 15, 17:
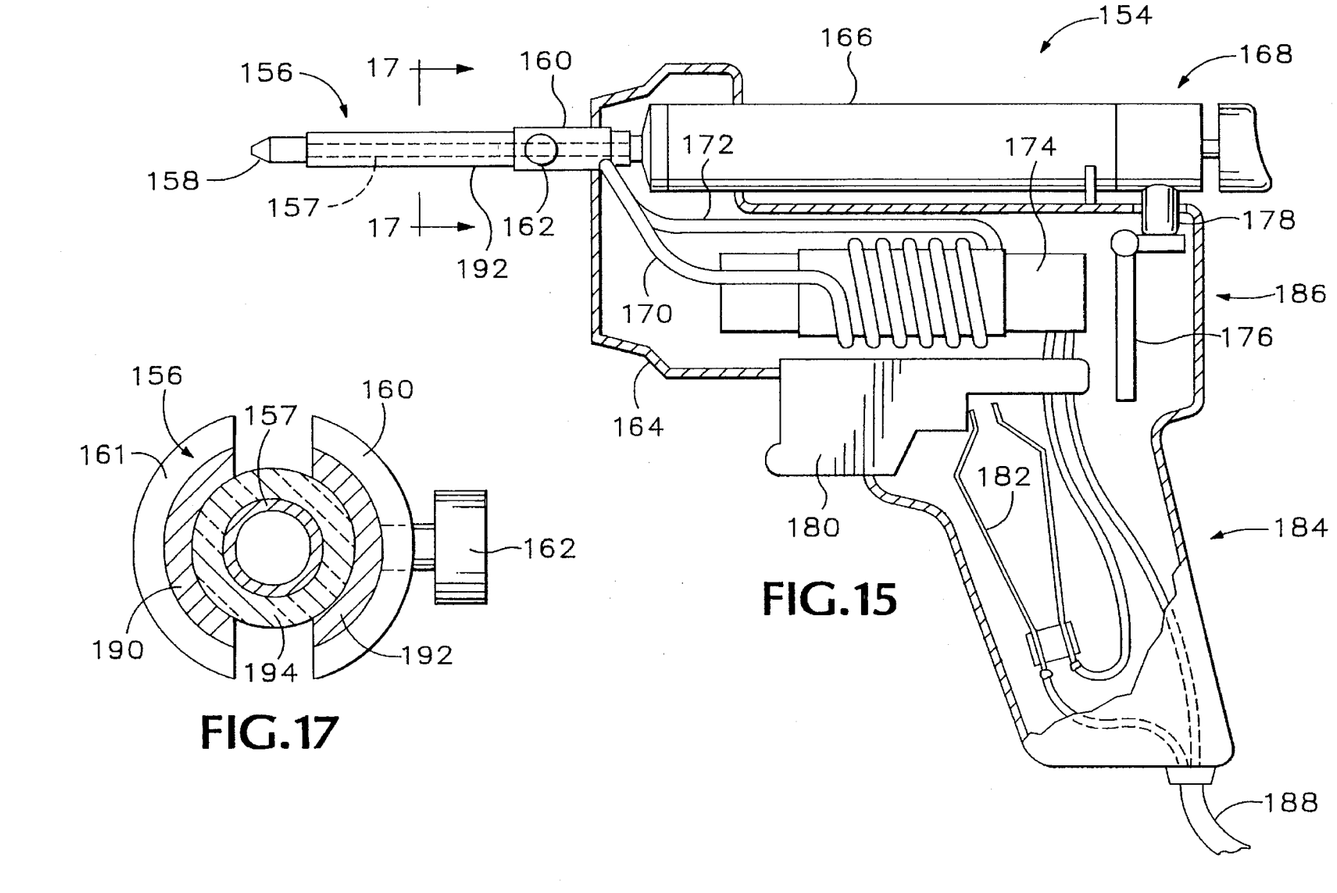
FIG. 15 is a partially broken away side view of a soldering device according to another embodiment of the invention.
FIG. 17 is a front-section of the soldering device shown in FIG. 15 taken along line 17—17.

FIG. 15 is a partially broken away side view of a solder gun 154 with a universal connector 156 according to another embodiment of the invention. The solder gun 154 includes a "gun-type" casing 164 having a generally vertically aligned handle portion 184 and a horizontally aligned barrel section 186. A trigger 180 in handle 184 is movable into various positions pressing against both contacts 182 and lever 176 as will be described in more detail below. A power cord 188 is coupled through the contacts 182 to a transformer 174. The transformer in turn is coupled by wires 170 and 172 to a pair of horizontally aligned terminals 160 and 161, respectively.

A detachable plunger 166 extends out of the top of casing 164 and includes a locking mechanism 168 having a downwardly directed button 178 that makes contact with lever 176. The plunger 166 operates in a manner similar to plunger 112 previously shown in FIG. 9. An electric vacuum system as described in U.S. Pat. No. 4,023,724 to Wakita et al. can be used instead of the plunger system shown in FIG, 15.

Universal connector 156 is detachably joined at the front end to a solder tip 158 and detachably joined at a back end to terminals 160 and 161, A screw 162 extends horizontally through terminal 160 clamping against a lead 192. A pipe 157 extends through universal connector 156 and is sealed at a back end to the front end of plunger 166.

Figure 16:
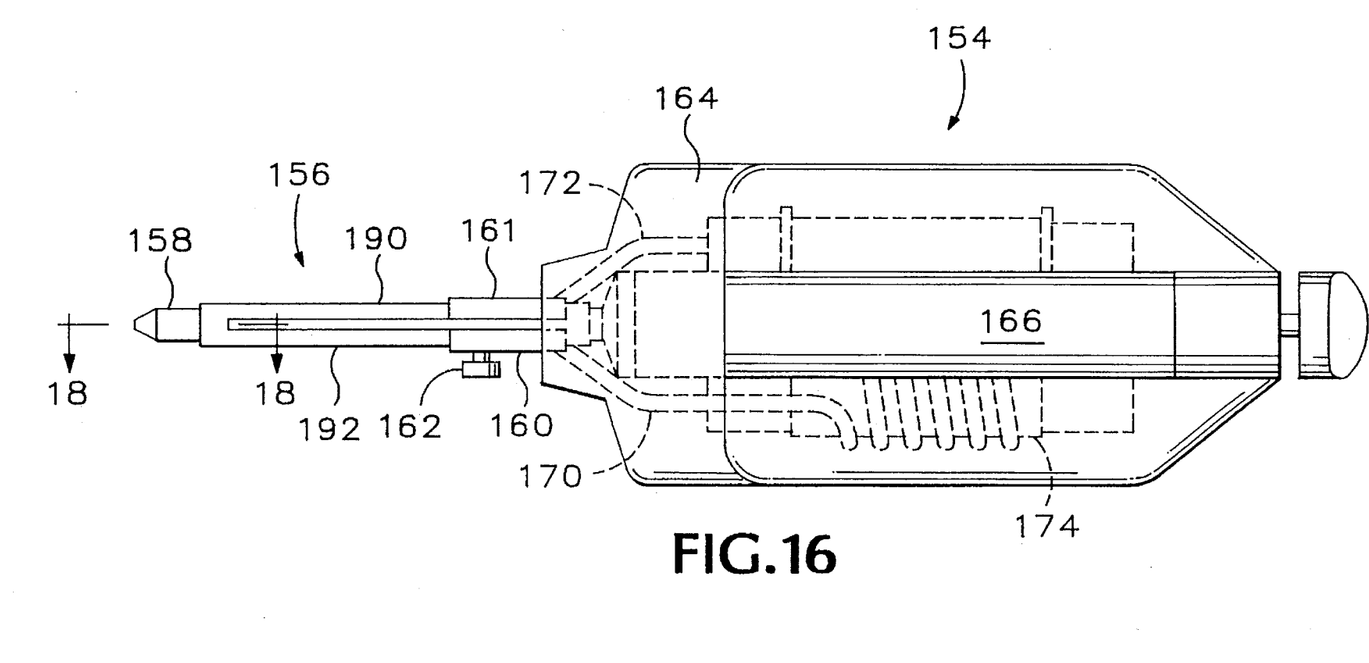
FIG. 16 is a top view of the soldering device shown in FIG. 15.

FIG. 16 is a top view of the solder gun 154 shown in FIG. 15. The transformer 174 is laid flat underneath the plunger 166 to minimize the size of casing 164. Normally solder gun transformers are positioned upright with a secondary winding positioned above a primary winding. The casing 164 extends partially over the front end of plunger 166 so that the plunger can be detached and ingested solder removed.

Universal connector 156 includes a left lead 190 and a right extension 192 similar to the upper and lower leads of solder tip 52 shown in FIG. 2. Power from transformer 174 is transferred from wire 172 through the left lead 190 to solder tip 158. Energy from the transformer 174 heats tip 158 and returns back through wire 170 via lead 192 and terminal 160.

FIG. 17 is a front-section of the universal connector 156 taken along line 17—17 in FIG. 15. Terminals 161 and 160 are slightly "U-shaped" and oriented in opposed directions. Each terminal is shaped to press against the outside surface of an associated lead 190 and 192. A sleeve 194 made in one embodiment from a heat resistant fabric is wrapped around pipe 157 insulating pipe 157 from universal connector 156. Alternatively, pipe 157 can be made from a non-conductive heat resistive material and universal connector 156 joined directly to the outside surface of pipe 157. Pipe 157, as well as pipe 124 shown in FIG. 9, are made from stainless steel or some equivalent that will not stick to the molten solder while passing into plunger 166.

Figure 18:
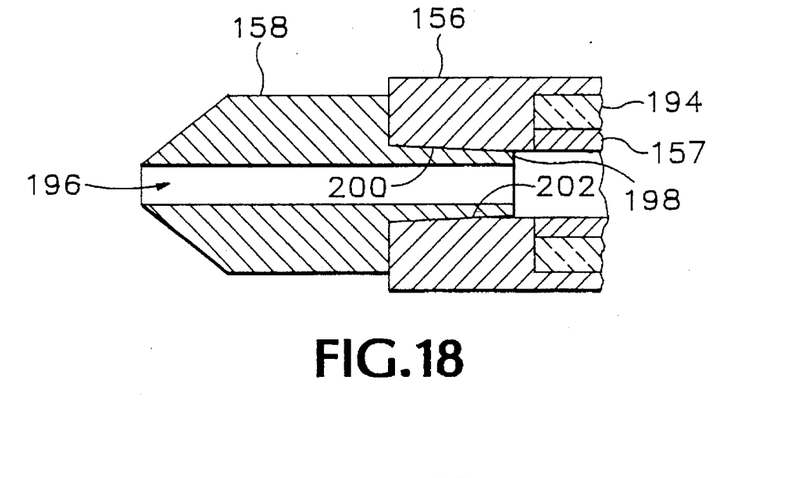
FIG. 18 is a detailed top section of a hollow solder tip attached to the soldering device previously shown in FIG. 15 taken along line 18—18.

FIG. 18 is a detailed partial side section of the solder tip 158 and the front end of universal connector 156 shown in FIG. 16. The solder tip 158 contains a mounting section 198 that press fits into the front end of connector 156. An internal cavity 196 passes through the solder tip 158. The tip 158 when press fit into connector 156 creates an air tight seal between cavity 196 and the inside of pipe 157.

In a manner similar to the Universal connector 106 previously shown in FIG. 10, front inside walls 200 and 202 of connector 156 are oppositely inclined and have a given angle that tightly joins to solder tip 158. Inside walls 200 and 202 are angled so that solder tip 158 is easily removable with pliers after it has been slightly heated.

Figure 19:
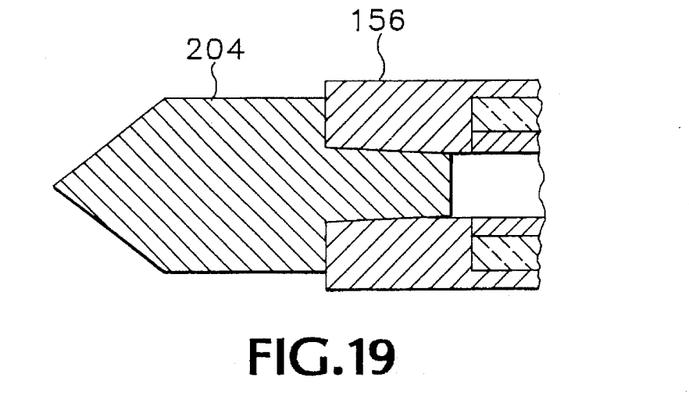
FIG. 19 is a detailed top section of a solid solder tip according to another embodiment of the invention.
Figure 20:
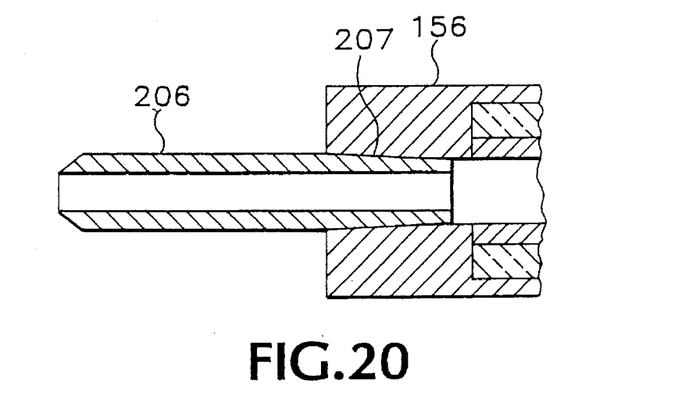
FIG. 20 is a detailed top section of another hollow solder tip according to another embodiment of the invention.

FIG. 19 is a side-section of a solid solder tip 204 that is also insertable into the front end of connector 156. Solder tip 204 replaces solder tip 158 (FIG. 18) when solder gun 154 (FIG. 15) is used for applying solder. FIG. 20 is an alternative hollow solder tip 206 also insertable into the front end of connector 156. A wide variety of tips can be designed for inserting into connector 156 according to the required soldering or desoldering task. The solder tips shown in FIGS. 18–20 have a tapered back end that have substantially the same taper angle as inside walls 200 and 202 for holding the solder tips securely inside the connector 156. Further, a composite solder tip similar to solder tip 135 (FIG. 12B) can be used with connector 156.

Figure 21:
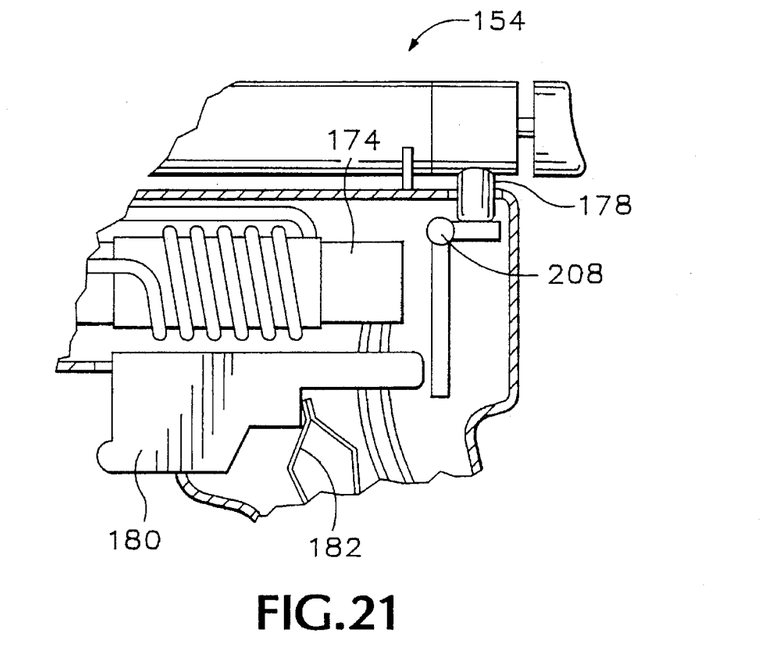
FIG. 21 is a detailed partially broken away side view of the soldering device shown of FIG. 15 shown in a second trigger position.
Figure 22:
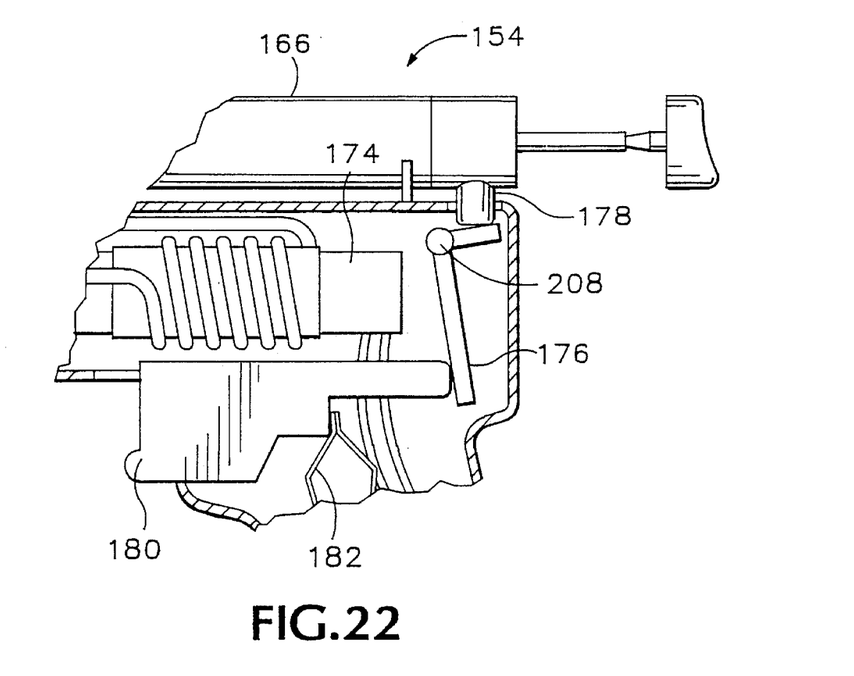
FIG. 22 is a detailed partially broken away side view of the soldering device shown of FIG. 15 shown in a third trigger position.

FIG. 15 shows solder gun 154 in a first trigger position where transformer 174 is deactivated and solder tip 158 is not heated. FIG. 21 is a partially broken away side-view of solder gun 154. Trigger 180 is shown moved into a second position where contacts 182 are pressed together activating transformer 174 in turn heating solder tip 158. FIG. 22 is a partially broken away side-view of solder gun 154 showing trigger 180 moved into a third position. In the third trigger position, trigger 180 presses contacts 182 together and at the same time pushes lever 176 activating plunger 166.

By depressing trigger 180 into the second position shown in FIG. 21, transformer 174 is activated outputting current and heating the solder tip presently inserted into lead 156 (see FIGS. 18–20). The operation of solder guns are well known to those skilled in the art and, therefore, the specifics on how transformer 174 heats the solder tips is not described in detail.

Referring to FIGS. 15–22, the operation of solder gun 154 is now described. Solder gun 154 operates as a solder sucker by first form fitting a hollow solder tip, such as solder tip 158 or 206 into the front end of connector 156.

Plunger 166 is locked into a "cocked" position as shown in FIG. 15. Initially, trigger 180 is in the first position as shown in FIG. 15. In the first position, transformer 174 is deactivated and no energy is transferred to the solder tip 158. Thus, solder tip 158 is not being heated.

When trigger 180 is moved into the second trigger position, as shown in FIG. 21, contacts 182 are pressed together completing a connection between cable 188 and transformer 174. Transformer 174 is in turn activated transferring energy through connector 156 heating solder tip 158. Solder tip 158 is then pressed upon an existing solder joint and melted.

Trigger 180 is then moved into the third position shown in FIG. 22. In the third position, trigger 180 continues to press the two ends of contact 182 together and at the same time pushes against lever 176. Lever 176 rotates about a hinge 208 depressing button 178 and releasing the plunger 166 from the "cocked" position in a manner similar to that described above in FIG. 9.

A puck in plunger 166 is then pulled backwards in the plunger chamber by a spring (see FIG. 9). A vacuum is created in the plunger chamber creating a suction at the front end of solder tip 158. The molten solder is then pulled through pipe 157 into the chamber in plunger 166. If necessary, the plunger 166 is then locked back into the "cocked" position by locking mechanism 168 and the solder extraction process described above repeated.

To apply solder, hollow solder tip 158 is removed and a solid solder tip, such as solder tip 204 (FIG. 19), is inserted into the front end of connector 156. Trigger 180 is then moved into the second position shown in FIG. 21 causing solder tip 204 to heat.

Trigger 180 is depressed only when the solder tip must be heated for applying or removing solder. Thus, energy is not wasted in continuously heating solder tips to keep them ready for use.

Unlocking plunger 180 from the "cocked" position with trigger 180 allows easier more precise solder extraction than present solder suckers. For example, typical solder suckers (see FIG. 8) require one hand to hold the solder sucker and another hand to depress button 43. However, the trigger 180 on solder gun 154 unlocks plunger 166 from the "cocked" position with the same finger and with substantially the same finger movement used for initiating the heating of the solder tip. Thus, solder extraction can be performed immediately after a solder miscue has occurred and with more control than present solder suckers.

Trigger 180 can also include a fourth position for altering the amount of current supplied by transformer 174 to the solder tip. Thus, solder gun 154 is not only used for both applying and removing solder but can also provide variable solder tip temperature control.

Figure 23:
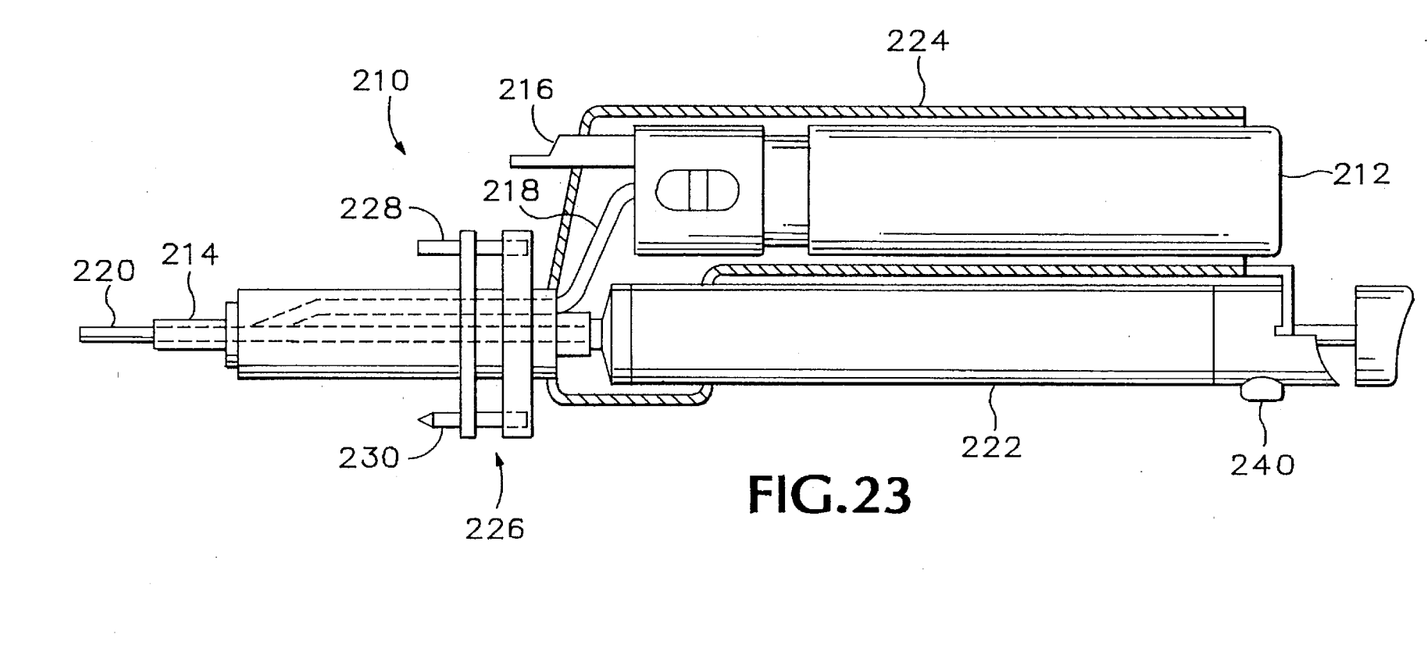
FIG. 23 is a partially broken away side view of a butane heated soldering device with a universal connector according to another embodiment of the invention.

FIG. 23 is a side view of a solder sucker 210 having a butane fuel cylinder 212. Butane heating systems for soldering irons such as Model No. 100.540510 made by Sears, Roebuck and Co. Chicago, Ill. 60684 are well known to those skilled in the art. Butane solder guns are also described in detail in U.S. Pat. Nos. 4,699,123 and 4,733,651 and are, therefore, not described in detail.

Solder gun 210 operates in a manner similar to the soldering device 104 previously shown in FIG. 9. However, a universal connector 214 is heated by igniting the butane fuel in cylinder 212. A button 216 when depressed ignites the butane fuel in cylinder 212. Heat from the burning fuel is then transferred through a chamber 218 to the back end of universal connector 214.

Universal connector 214 receives hollow tips such as tip 220 for removing solder and also receives solid tips for applying solder. A plunger 222 operates in a manner similar to plunger 112 shown in FIG. 9. Plunger 222 is also detachable from a casing 224 for removing ingested solder. A rack 226 is similar to rack 130 previously shown in FIG. 9 and is used to hold additional tips such as hollow solder tip 228 and solid solder tip 230.

The soldering device 210 is used for both applying or removing solder as described above. For example, if a hollow solder tip is inserted into universal connector 220, a solder joint can be melted and sucked into an internal chamber in ! plunder 222 by pressing a button 240. Plunger 222 is released from the "cocked" position shown in FIG. 23 creating a suction at the front end of hollow solder tip 220. Alternatively, solid solder tip 230 is inserted into the front of universal connector 214 and soldering device 210 used for applying solder.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A soldering device, comprising:

a first terminal providing an energy feed path and a second terminal providing a energy return path, the first and second terminals spaced a predetermined distance apart forming a single terminal cavity; and an elongate solder tip including first and second leads each elongated in parallel alignment from a front end to a back end forming an outside surface with a uniform cross-sectional profile including interior lead cavities aligned in opposed directions forming a slot for retaining an insulative material, the first and second leads conductively joined together at the front ends forming a front end tip having an outer solder tip surface the outer surface of the front end tip including n rear end having a cross-sectional profile substantially equal to the cross-sectional profile formed by the first and a second leads and tapering down to a front point;

the back ends of the first and second leads insertable and rigidly held inside the terminal cavity thereby electrically coupling the first lead to the first terminal and the second lead to the second terminal.

2. A soldering device according to claim 1 wherein the terminal cavity formed by the first and second terminals has substantially the same cross-sectional profile as the cross-sectional profile formed by the first and second leads.

3. A soldering device according to claim 1 wherein the first and second leads each have a substantially U-shaped cross-sectional shape aligned in opposing directions.

4. A soldering device according to claim 1 including an insulating material snugly pressed between the first and second leads when said leads are inserted inside the terminal cavity.

5. A soldering device according to claim 1 wherein at least one terminal includes a hole for inserting a screw, the screw insertable through said hole clamping against one of said first and second leads.

6. A soldering device according to claim 1 wherein the front end tip of the solder tip has a downwardly sloping claw shape.

7. A soldering device according to claim 1 wherein each lead of the solder tip comprises a metal compound of a first metal having a high impedance that varies with temperature and a second metal of copper.

8. A soldering device according to claim 1 wherein the terminal cavity has a diameter of approximately four millimeters.

9. A soldering device according to claim 1 including a trigger for coupling and decoupling power to the terminals.

10. A soldering device comprising:

a first terminal providing an energy feed path and a second terminal providing a energy return path the first and second terminals spaced a predetermined distance apart forming a cavity; and an elongate solder tip including first and second parallel leads each having a front and back end, the first and second leads joined together at the front ends forming a front end tip and an outer solder tip surface;

the back ends of the first and second leads insertable and rigidly held inside the terminal cavity thereby electrically coupling the first lead to the first terminal and the second lead to the second terminal;

each lead of the solder tip comprising a core of steel covered by a second layer of copper.

11. A solder tip for a solder gun, the solder gun generating a drive current, comprising:

a core layer having an impedance that varies according to solder tip temperature; and a second layer surrounding the core layer having a relatively low impedance in comparison to the impedance of the core layer, the impedance of the second layer remaining substantially constant with variances in solder tip temperature;

the combination of the first and second layers maintaining a constant solder tip temperature for variances in solder gun drive current.

12. A solder tip according to claim 11 wherein the impedance of the first layer increases with temperature.

13. A solder tip according to claim 11 wherein the solder tip temperature remains substantially constant for approximately 0–40 percent variances in the drive current.

14. A solder tip according to claim 11 wherein the core layer is steel and the second layer is copper, the core layer comprising approximately between 85–70 percent of the solder tip thickness and the second layer comprising approximately between 15–30 percent of the solder tip thickness.

15. A solder tip according to claim 11 wherein the solder tip comprises first and second leads, each having a U-shaped cross section, aligned in opposite directions.

16. A method for inserting and holding first and second solder tip leads having a center insulative material between a pair of terminals coupled to opposite polarities of a power supply in a soldering device, comprising:

spacing the first and second terminals apart a given distance forming a terminal cavity;

spacing the first and second leads of the solder tip apart a given distance;

inserting the insulative material the first and second leads;

pressing the first and second leads together compressing the insulative material while inserting the leads of the solder tip into the terminal cavity so that each lead makes electrical contact with a corresponding terminal; and releasing the leads so that the terminals hold the first and second leads in compression against the insulative material while the first and second leads remain separated.

* * * * *